US008484195B2

(12) United States Patent
Acosta-Cazaubon

(10) Patent No.: US 8,484,195 B2
(45) Date of Patent: *Jul. 9, 2013

(54) ANONYMOUS REFERENDUM SYSTEM AND METHOD

(75) Inventor: Jesus Acosta-Cazaubon, Atlanta, GA (US)

(73) Assignee: Yottavote, Inc., Smyrna, GA (US)

( * ) Notice: Subject to any disclaimer, the term of this patent is extended or adjusted under 35 U.S.C. 154(b) by 65 days.

This patent is subject to a terminal disclaimer.

(21) Appl. No.: 13/211,397

(22) Filed: Aug. 17, 2011

(65) Prior Publication Data

US 2012/0290556 A1 Nov. 15, 2012

Related U.S. Application Data

(60) Provisional application No. 61/484,996, filed on May 11, 2011.

(51) Int. Cl.
*G06F 17/30* (2006.01)

(52) U.S. Cl.
USPC .......................................... 707/711; 707/769

(58) Field of Classification Search
USPC .................................. 707/711, 769
See application file for complete search history.

(56) References Cited

U.S. PATENT DOCUMENTS

| | | | |
|---|---|---|---|
| 4,851,988 A * | 7/1989 | Trottier et al. ................ | 709/226 |
| 6,175,833 B1 | 1/2001 | West et al. | |
| 6,935,561 B2 | 8/2005 | Chernomorov | |
| 6,978,263 B2 * | 12/2005 | Soulanille ............................ | 1/1 |
| 7,130,885 B2 | 10/2006 | Chandra | |
| 7,657,738 B2 | 2/2010 | Canard et al. | |
| 7,813,963 B2 | 10/2010 | Pen | |
| 7,929,805 B2 | 4/2011 | Wang et al. | |
| 2002/0007457 A1 * | 1/2002 | Neff .............................. | 713/180 |
| 2002/0077887 A1 | 6/2002 | Shrader et al. | |
| 2003/0078838 A1 | 4/2003 | Szmanda | |
| 2003/0172067 A1 | 9/2003 | Adar et al. | |

(Continued)

FOREIGN PATENT DOCUMENTS

| | | |
|---|---|---|
| WO | WO 01/42873 | 6/2001 |
| WO | WO 0142873 A2 * | 6/2001 |

OTHER PUBLICATIONS

Written Opinion of the International Searching Authority, PCT/US2012/037262, USPTO, Jul. 27, 2012.

(Continued)

*Primary Examiner* — Monica Pyo
(74) *Attorney, Agent, or Firm* — Tracy Jong Law Firm; Tracy P. Jong; Cheng Ning Jong

(57) ABSTRACT

An anonymous referendum system provides a means for an end user to enter an answer to a referendum without being forced to navigate to a secondary interface. The anonymous referendum system has a server that includes a database for storing available referendums and their corresponding status, operating parameters and answers, an answer checker for tallying or discarding an answer and at least one client that includes an interface. In the case a cookie is stored at the interface, the message is transmitted back to the server with a hashed cookie as a field in the header portion of the message. In the case a cookie is not used, a hashed MAC address is inserted as a field in the header portion. A mechanism for causing sharing of information between referendum pools is further disclosed.

12 Claims, 6 Drawing Sheets

U.S. PATENT DOCUMENTS

| | | |
|---|---|---|
| 2005/0055306 A1* | 3/2005 | Miller et al. .................... 705/37 |
| 2006/0053195 A1 | 3/2006 | Schneider et al. |
| 2007/0100699 A1 | 5/2007 | Ajizadeh |
| 2007/0174876 A1 | 7/2007 | Maggio |
| 2007/0192179 A1 | 8/2007 | Van Luchene |
| 2008/0070550 A1 | 3/2008 | Hose |
| 2009/0138723 A1* | 5/2009 | Nyang et al. .................. 713/182 |
| 2010/0169803 A1 | 7/2010 | Mazzei et al. |
| 2011/0082824 A1 | 4/2011 | Allison et al. |

OTHER PUBLICATIONS

International Preliminary Report on Patentability, PCT/US2012/037262, USPTO, Feb. 8, 2013.

* cited by examiner

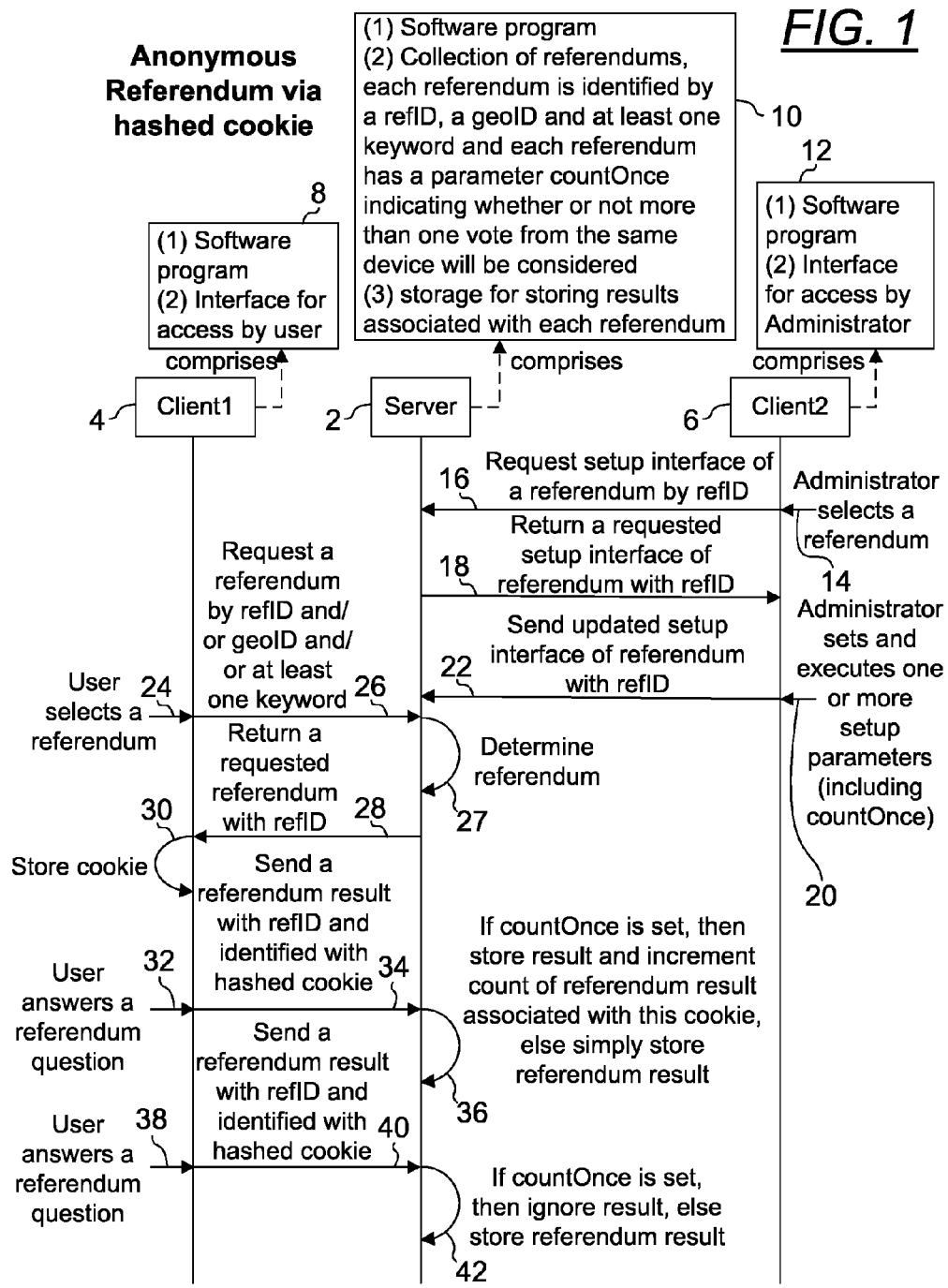

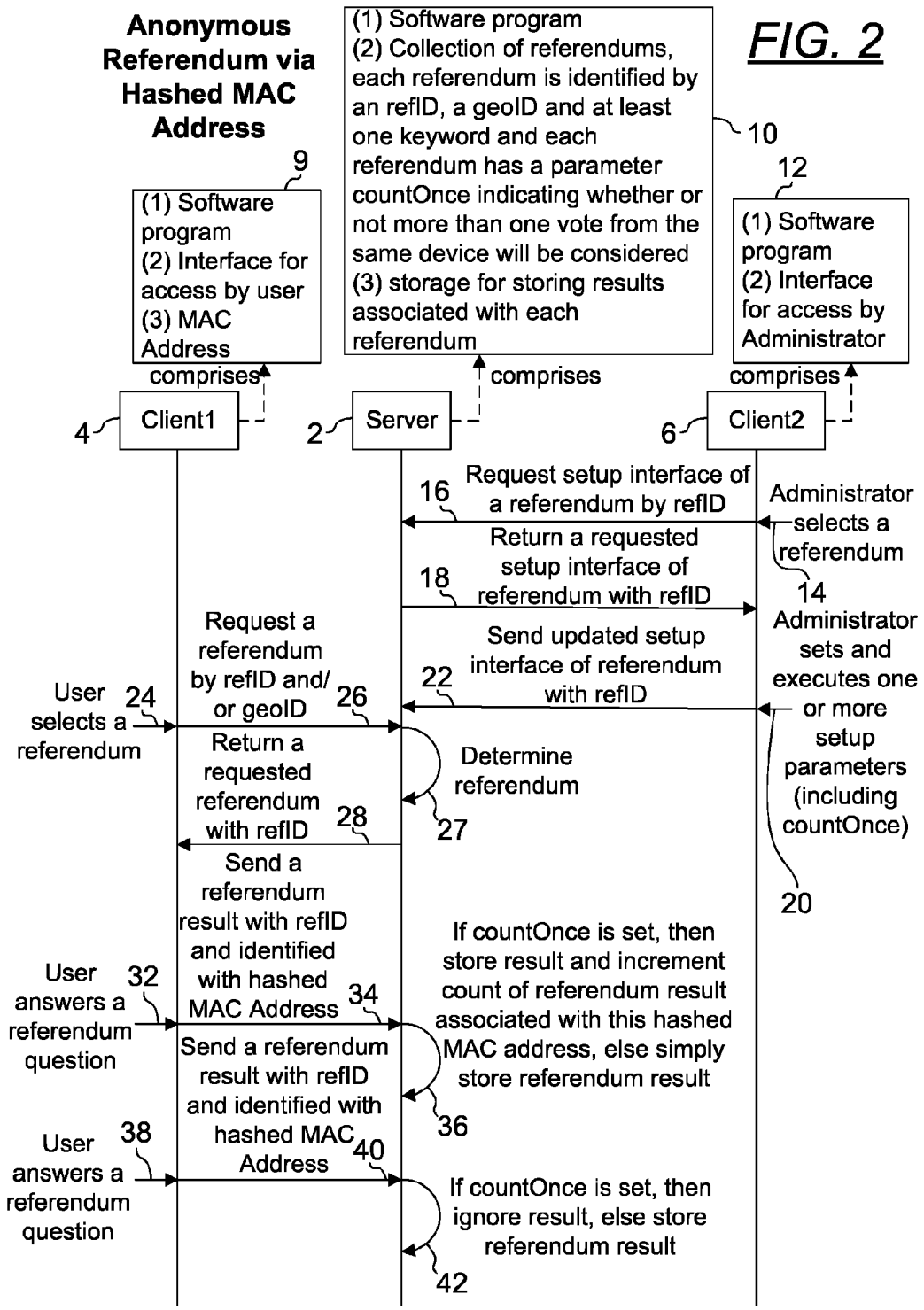

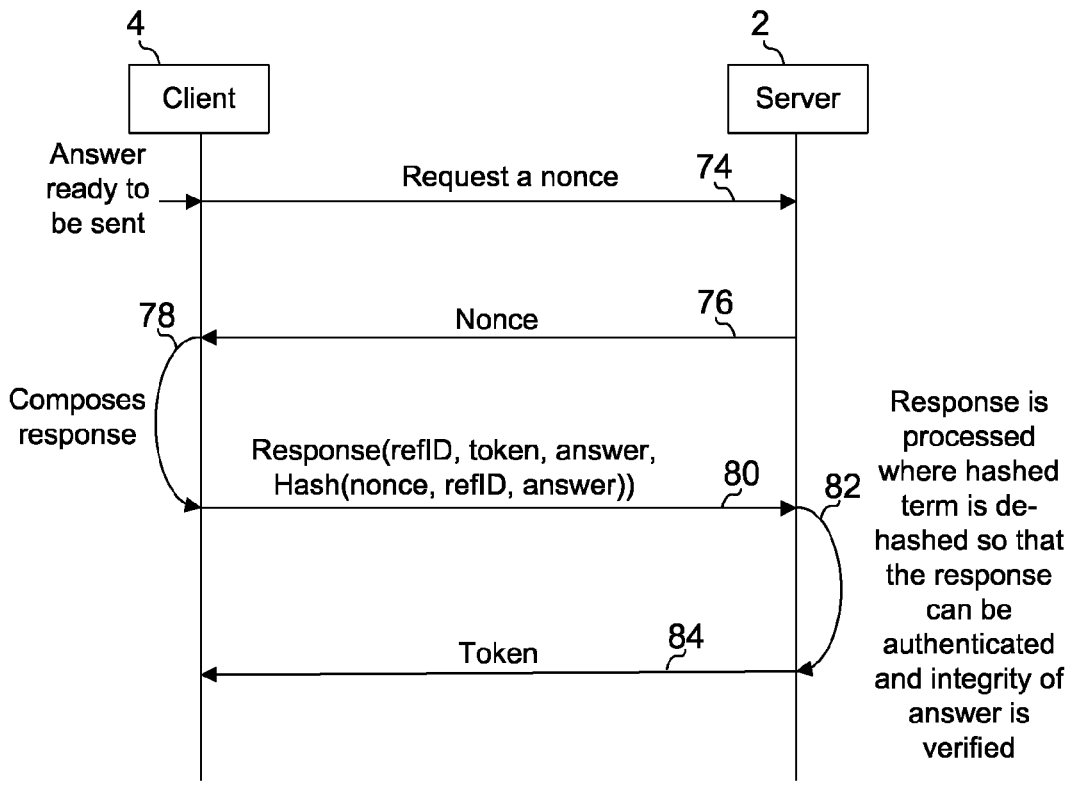
FIG. 2A
PRIOR ART
FIG. 3
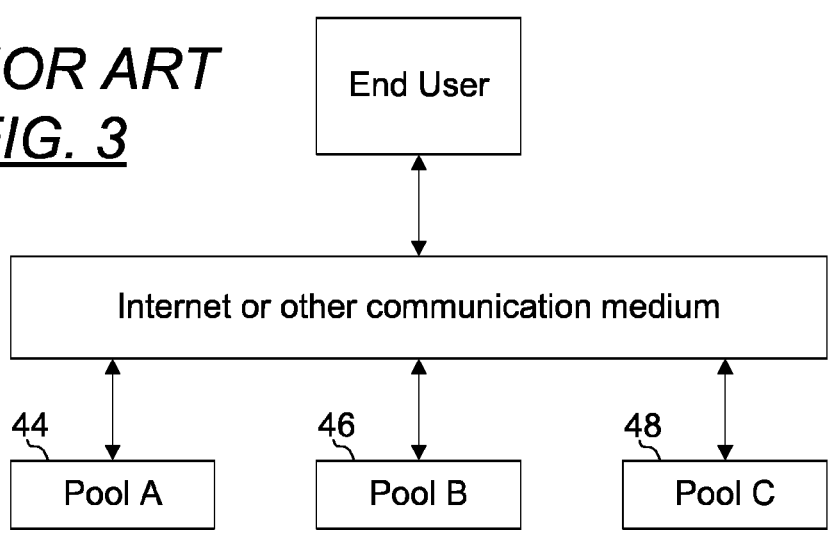

US 8,484,195 B2

ANONYMOUS REFERENDUM SYSTEM AND METHOD

RELATED APPLICATIONS AND PRIORITY CLAIM

This application claims priority to provisional application U.S. Ser. No. 61/484,996 filed May 11, 2011. Said application is incorporated by reference herein in its entirety.

BACKGROUND OF THE INVENTION

1. The Field of the Invention

The present invention is directed generally to a system and method for electronically and anonymously conducting and participating in a referendum.

2. Background Art

U.S. Pat. No. 7,813,963 discloses a method and system for increasing the yield of response to an electronic solicitation to take action by presenting direct action links within the solicitation itself. It was disclosed that these direct action links are distinguished by the ability to initiate a transaction when a user interacts with them. It was further disclosed that the enhanced program has the capability of storing information about the user of the system for authorizing future transactions. FIG. 1 of the '963 patent depicts a referendum interface for a transaction that does not maintain anonymity. In fact, column 6 lines 52-53 and column 8 lines 22-23 of '963 teach a referendum that is contrary in nature to the one of the benefits offered by the present invention, i.e., anonymity. The '963 patent discloses an interface that allows a user to enter email addresses of his/her friends such that they may receive and weigh in on the same referendum.

U.S. Pat. No. 6,175,833 discloses an online voting system which provides a standardized database architecture that integrates editorial and production processes. The voting system has a survey database to store multiple surveys and a server to serve the surveys over a network to readers. Column 7 lines 41 to 53 discloses a mechanism by which a request is identified, i.e., the GUID. As will be appreciated by those skilled in the art, a GUID is traceable to the computer which creates it.

"In the OSF-specified algorithm for generating new (V1) GUIDs, the user's network card MAC address is used as a base for the last group of GUID digits, which means, for example, that a document can be tracked back to the computer that created it." http://en.wikipedia.org/wiki/Globally_unique_identifier However, a mechanism which enables tracing may not be tolerated by users concerned by privacy issues. Therefore, such a mechanism fails to inspire confidence amongst would-be referendum takers and therefore lacks the appeal to attract referendum participation.

U.S. Pat Pub. No. 2007/0192179 discloses systems and methods for survey based qualification of keyword searches and survey based qualification of keyword advertising. A searcher provides a search query to a search engine and is presented with at least one query-specific survey question. The searcher's original query and/or response to the query-specific survey question(s) are then used to generate search results. Although the concept of utilizing a survey result for refining a search process is disclosed, this disclosure however does not teach a referendum system that is anonymous, simple to use and a system and method in which referendums are standardized to promote sharing of referendum data.

Thus, there arises a need for a referendum system and method that are truly anonymous and simple to use such that referendum participation can be improved. Further, there arises a need for a referendum system and method where disparate referendum systems may be combined to increase sample size for providing statistically reliable information.

SUMMARY OF THE INVENTION

The present invention is directed toward a system and a method for conducting an anonymous referendum that provides a means for an end user to enter an answer to a referendum without being forced to navigate to a secondary interface. The anonymous referendum system has a server that includes a database for storing available referendums and their corresponding status, operating parameters and answers, an answer checker for tallying or discarding an answer and at least one client that includes an interface. An end user sends a request to the server for a referendum. In response to the request, the server transmits a referendum identified by a referendum ID based on geolocation data, refID and/or at least one keyword specified in the request to the interface. In one embodiment, a cookie is additionally transmitted to and stored at the interface. Upon the end user selecting an answer to the referendum, the answer is transmitted in a message having a header portion and a data portion from the interface to the server. In the case where a cookie is stored at the interface, the message is transmitted back to the server with a hashed cookie as a field in the header portion of the message. In the case a cookie is not used, a hashed MAC address is inserted as a field in the header portion. The referendum answer and the referendum ID are embedded in the data portion. Upon receiving the message, the answer checker determines whether or not a message having identical hashed cookie or hashed MAC address (or credential) has been received previously. If a message with identical credential has been received previously, the referendum answer is discarded and not acted upon. Otherwise the referendum answer is added to the referendum identified with referendum ID.

The method comprises (1) transmitting a request from a client system to a server system for a referendum, wherein the request comprises at least one user specific data, (2) determining a referendum as identified by a referendum identifier and corresponding to the at least one user specific data of the request, (3) returning the referendum from the server system to the client system, (4) transmitting a referendum result from the client system to the server system via a message having a header portion and a data portion, wherein the header portion comprises a unique identifier identifiable to the server system as originating from a source but not identifiable with respect to the true identity of the client system, (5) comparing the unique identifier to a list of unique identifiers and adding the unique identifier to the list of unique identifiers. If the unique identifier does not match a member of the list of unique identifiers, the referendum result is added to a database relating the referendum to a list of referendum results. If the unique identifier matches a member of the list of unique identifier, the referendum result is discarded. True identity is defined as the identity of any computing devices used in accessing the internet through an internet protocol (IP) address assigned by an internet service provider.

The present referendum system has a storage to store results associated with referendums, a server system to serve the referendum question over a network to users, at least one client system to transmit at least one referendum result of the referendum to the server system via a message including a header portion and a data portion wherein the header portion comprises a unique identifier identifiable to the server system as originating from a source but not identifiable with respect to the true identity of the at least one client system and a software program to compare the unique identifier to a list of unique identifiers. If the unique identifier does not match a member of the list of unique identifiers, the at least one referendum result is added to the storage and if the unique identifier matches a member of the list of unique identifiers, the at least one referendum result is discarded.

The present invention further includes a method for sharing referendum information within a system having a plurality of referendum pools and an index pool server. Each referendum pool includes an external list and a local list. The index pool server includes a global list. The method comprises (1) creating a referendum with a local identifier in each of the external and local lists of a referendum pool, (2) transmitting a request for a temporary referendum identifier from the referendum pool to the index pool server, (c) returning a temporary referendum identifier from the index pool server to the referendum pool, (d) associating the temporary referendum identifier to the external list of the referendum pool, and (e) determining whether the referendum is equivalent to a member having a global identifier of the global list, whereby if the referendum is equivalent to a member of the global list, (i) the member is transmitted to the referendum pool, (ii) the temporary referendum identifier and the referendum are deleted from the external list of the referendum pool, (iii) the referendum is deleted from the local list of the referendum pool, (iv) the member is added to the local and external lists. If the referendum is not equivalent to any member of the global list, (i) the referendum is added to the global list, said referendum is broadcast to the plurality of referendum pools, (ii) the local identifier of the referendum is replaced with the global identifier of the referendum and (iii) the referendum is added to all external and local lists of the other referendum pools of the plurality of referendum pools.

Accordingly, it is a primary object of the present invention to provide a referendum system and method that is anonymous such that the origin of a client system is not traceable.

It is another object of the present invention to provide a referendum system that has a simple user interface and one that does not require an end user to navigate away from the user interface in order to respond to the referendum system.

It is yet a further object of the present invention to provide a referendum system that enables information flow between two or more referendum databases.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1 is a sequence diagram depicting the anonymous execution of a referendum using a hashed cookie (or token) according to the present invention.

FIG. 2 is a sequence diagram depicting the anonymous execution of a referendum using a hashed MAC address according to the present invention.

FIG. 2A depicts a mechanism where a token is used to indicate a client source and a hashed result is used to ensure the integrity of the transmission of a referendum answer from the client source.

FIG. 3 is a block diagram depicting prior art referendum pools maintained by disparate servers.

PARTS LIST

Figure 4:
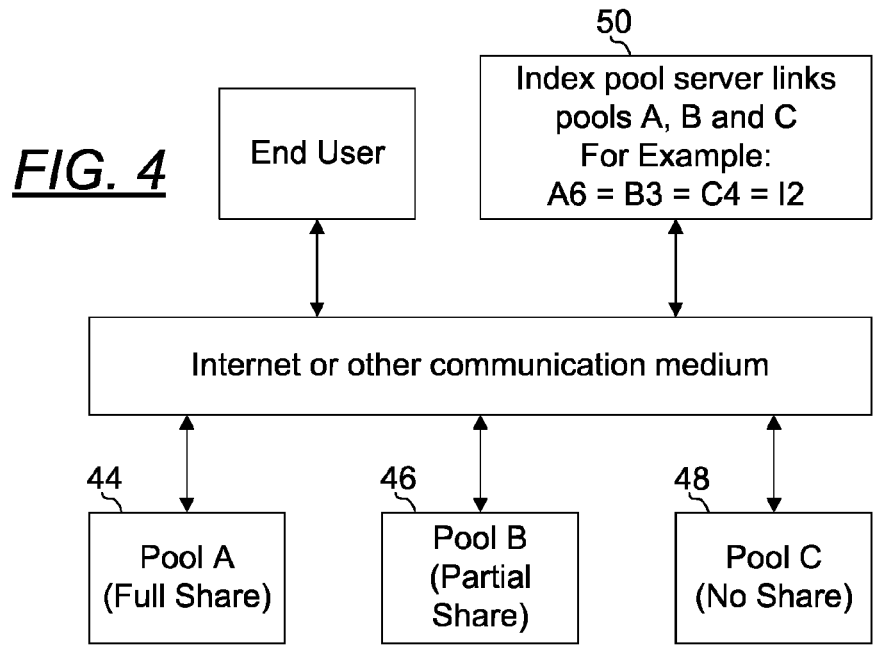
FIG. 4 is a block diagram of the present invention depicting a mechanism by which referendum pools of disparate servers are shared.

2—server
4—client1
6—client2
8—facilities available at client1
9—facilities available at client1 when hashed MAC address is used
10—facilities available at server
12—facilities available at client2
14—act of an administrator selecting a referendum
16—request for a setup interface of a referendum as identified by refID
18—transmission of a requested setup interface of a referendum as identified by refID
20—act of an administrator setting and executing one or more setup parameters including a switch for indicating whether multiple referendum results from a device should be considered (countOnce)
22—transmission of an updated setup interface of a referendum as identified by refID
24—act of an end user selecting a referendum
26—request for a referendum as identified by refID, geoID and/or one or more keywords
27—determine a referendum to be sent from server to client
28—transmission of a requested referendum as identified by refID, geoID and/or one or more keywords
30—act of storing cookie in software program of end user
32—act of an end user answering a referendum question the first time
34—transmission of a referendum result as identified by hashed cookie
36—act of responding to a received referendum result
38—act of an end user answering a referendum question the second time
40—transmission of a referendum result as identified by hashed cookie
42—act of responding to a received referendum result
44, 46, 48—referendum pools A, B and C respectively
50—index pool server
52—request to take out a temporary referendum ID from index pool server 54—transmission of a temporary referendum ID from index pool server to a referendum pool requesting it 56—act of adding a temporary referendum ID to an external list of a referendum pool 58—act of determining if a referendum already exists in a global list 60—transmission of an existing referendum with refID 62—acts of deleting the referendum associated with the temporary referendum ID and adding existing referendum with refID in external list of referendums 64—acts of deleting the counterpart referendum associated with the temporary referendum ID in the local list of the requesting referendum pool and adding existing referendum with refID to the local list 66—act of adding a newly indexed referendum to the global list 68—broadcast of newly indexed referendum with refID 70—act of replacing the identifier of current referendum with refID in external list 72—act of adding new referendum of refID to external and local lists 74—request for a nonce from server 76—transmission of nonce from server to client 78—act of composing a response 80—transmission of response from client to server 82—act of processing response 84—transmission of token from server to client 86—survey server 88—set of criteria

PARTICULAR ADVANTAGES OF THE INVENTION

The present referendum system provides a system and method for anonymously submitting a referendum result to a server. The present referendum provides a client system for an end user, the client system having an interface which enables fetching and submission of a referendum at the same interface without directing the end user to a second interface. The present referendum system also provides a server system which is configurable to avoid redundant referendum result entry from a client system. The present referendum system further provides a mechanism to cause sharing of information between disparate referendum pools possible, thereby increasing statistical sample size.

DETAILED DESCRIPTION OF A PREFERRED EMBODIMENT

A referendum as used herein connotes a type of survey requiring selection of one out of two choices presented. As an example, when presented with a question:
Referendum 1: "Do you drink Coca-cola in the morning?
Choice 1: Yes.
Choice 2: No.
A respondent to this referendum is expected to select a choice of either "Yes" or "No." A survey on the other hand can be viewed as a superset of referendums. For example, a combination of referendums may constitute a survey. A survey question covering the above referendum may resemble the following:
Survey: Do you drink Coca-cola during the day?
Choice 1: Yes, in the morning.
Choice 2: Yes, in the afternoon.
Choice 3: No, not during the day.
As compared to the survey, had the answer to the above example referendum been Choice 1: Yes, there is still the ambiguity of whether the referendum taker drinks Coca-cola in the afternoon. If the answer had been Choice 2: No, the question of whether the referendum taker drinks Coca-cola in the afternoon remains unanswered. However, had there been another referendum as follows used in conjunction with the earlier referendum, the combined outcomes of the referendums would have been equivalent to the answer to the survey.
Referendum 2: "Do you drink Coca-cola in the afternoon?
Choice 1: Yes.
Choice 2: No.
If Referendums 1 and 2 both return the answers of Choice 2, then the answers are logically equivalent to Choice 3 of the survey question. The answers of Referendum 1 and Referendum 2 mirror Choices 1 and 2 of the survey question respectively. Although Referendums 1 and 2 may or may be presented as a group simultaneously, for statistical purposes, the answer to the survey question can be deduced from the answers to Referendums 1 and 2 taken as a whole. Therefore, although the present referendum system is designed to be simple and non-intrusive, as will be described elsewhere herein, surveys of increased sophistication can be deduced from referendums. Further, as will also be described herein, the present referendum system provides a means for standardizing referendums so that referendum servers of various sources can be synchronized to increase statistical sample size. As referendums represent surveys in their most basic form, the ease with which referendums are synchronized is increased.

A "user" as applied herein, defines a person who responds to a referendum, a respondent, a person who administers, designs, controls a referendum or receives results of a referendum or an administrator.

FIG. 1 is a sequence diagram depicting the anonymous execution of a referendum using a hashed cookie according to the present invention. For completeness, an anonymous referendum concept is shown with a server and two clients, i.e., client1 4 and client2 6. Client1 4 represents an end user while client2 6 represents a referendum provider or administrator. Although a referendum provider may also be shown as part of the server 2, it is more succinctly shown as a separate entity which is both logically and physically separated from the server 2. Client1 4 includes a software program, for example, a web browser, a website, a software program other than a web browser or a website and an interface for access by an end user as shown in block 8. In the context of a web browser or a website, any information entered within the web browser is received and processed either by the web browser, the website or both. If a web browser is used, the present referendum system embodies a plug-in application of the web browser which returns referendums based on keywords entered within a website served by the web browser. In this instance, a linkage is provided between the web browser and any information entered in any website served by the web browser such that any information entered in a website can be obtained by the web browser. If a website is used, the present referendum system embodies an area on the website which receives any information entered in response to one or more referendums served at any one time. Similar to client1, client2 also comprises a software program and an interface as shown in block 12. Server 2 comprises a software program, a collection of referendums received either via communication from client2 6 or directly through an upload process (not shown) local to the server 2 and a storage associated with each referendum. In use, the software program of the server, the collection of referendums and the storage may be implemented as a database. Each referendum is identified by a reference identifier refID, a geolocation identifiers geoID, at least one keyword and includes a parameter indicating whether or not more than one vote from the same end user device will be considered. Each geoID is associated with a geographical area linked for instance by a postal code, range of Internet Protocol (IP) addresses assigned by Internet Service Providers (ISP) or certain Global Positioning System GPS location. Before a referendum may be used, one or more of its parameters must be set.

An administrator first selects a referendum he/she desires to set up (step 14). The interface of the software program of client2 receives this request and its software program transmits this request for a setup interface of a referendum as identified by a refID (step 16). The software program of the server 2 receives this request, performs a lookup of a referendum identified by refID and transmits a setup interface associated with this refID to client2 (step 18). The setup interface includes a means by which a parameter called countOnce is set. The parameter countOnce specifies whether or not multiple referendum results from a unique client should be considered. If countOnce is set, only one referendum result from a unique client will be considered. Otherwise, all referendum results from a unique user client will be tallied. The provider then sets and executes one or more parameters on the setup interface (step 20). The updated setup interface is then transmitted to the server (step 22). Upon setting up countOnce, the present referendum system is ready for use. Setup is performed only once for each referendum until new parameters are desired. If new parameters are desired, the aforementioned process is again invoked and completed. Alternatively, all referendums may be configured with most commonly used or preferred default parameters at upload to avoid running the aforementioned setup procedure.

An end user may then make a selection of a referendum through an interface of a software program (step 24). An interface can take many forms, for instance web browser, internet search engine, online newspaper, browser-controlled environment (e.g. Java applet), an interface coded in browser-supported language (e.g. Javascript) combined with a browser-rendered markup language such as HTML, social network interface and mobile gaming interface. It shall be noted that although the present invention is implementable in various interfaces, the ensuing example will be explained in the context of basic elements commonly available to each of these interfaces. The act of making such selection comes in the form of invoking a web browser, executing a search at an internet search engine, opening an email at an email client software or another interface. A common feature for each of these acts lies in the ease with which a referendum is presented to the end user. For instance, by invoking a web browser, a web page set as the home page of the web browser is automatically served. A referendum having properties (refID, geoID and keyword) matching those of a request from the web browser is transmitted to client1. In another instance, a search string is entered in an internet search engine and a search request is invoked. The request which contains a geolocation data can be automatically sent as a result of opening the interface or it can be a request that is sent upon clicking a button on the interface. Upon receiving the search request, a server of the internet search engine compares properties (geoID and/or at least one keyword) of the referendum and identifies a referendum matching those of the search request and transmits it along with the search result to the internet search engine at a client system. Therefore, an end user is not required to navigate away from an interface he/she is currently using. In contrast, U.S. Pat. Pub. No. 2007/0192179 discloses a system that is cumbersome to use as a user of such a system is redirected as evidenced in paragraph 19 of the '179 application, thereby discouraging the use of such a survey system:

"Success Criteria—shall mean any criteria defined by the advertiser indicating that a searcher has successfully performed an activity. These activities could be, but are not limited to (i) purchasing something from the advertiser's website (ii) filling out a survey on the advertisers website (iii) seeing the advertisers advertisement or (iv) going to the advertiser's or another sponsored link or website."

In the '179 application, the user is redirected to an advertiser's website where one or more additional actions are expected.

Referring again to FIG. 1, upon making a referendum selection, a request corresponding to the selection and containing any one or all of the request properties such as refID, geoID and at least one keyword is transmitted to the server 2 (step 26). Upon receiving the request, the software program of the server 2 performs a lookup of a referendum identified by refID, geoID and/or one or more keywords (step 27) and transmits a message representing the referendum associated with at least one of these properties to the interface of the software program of client1 (step 28). In one embodiment, a cookie is incorporated in the message transmitted to and stored (step 30) at the interface. As mentioned elsewhere herein, a message can be treated as having a header portion and a data portion. In one embodiment, the security of a message transmission is further enhanced by encrypting the data portion with a public key. A corresponding private key can be made available at the server such that the data portion of the message can be decrypted. The private key may also be made available to another client given the authority to access the contents of the message. Therefore the additional encryption to the data portion protects the message even if the header portion has been compromised.

Referring back to FIG. 1, the end user may then answer the referendum presented at the interface of the software program (step 32). The step of answering a referendum involves clicking a button presented on the interface. The software program of the interface at client1 then anonymously transmits the referendum result associated with the refID to the server 2 (step 34). Upon receiving the referendum result, the software program of server 2 determines whether to act upon the referendum result (step 36). If parameter countOnce of referendum of refID is set, then the referendum result is stored or tallied and a count associated with the hashed cookie is made available and incremented.

FIG. 1 further depicts the consequence of submitting a referendum result the second time from the same device. The end user answers the referendum presented at the interface of the software program (step 38). The software program of the interface at client1 again anonymously transmits the referendum result associated with the refID to the server 2 (step 40). Upon receiving the referendum result, the software program of server of block 10 again determines whether to act upon the referendum result (step 42). If parameter countOnce of referendum of refID is set and the count associated with a hashed cookie is non-zero, then the referendum result is discarded. This ensures that a referendum result is submitted at most once from one client if so desired. If parameter countOnce of referendum of refID is not set, the referendum is stored or tallied.

A web bot is a software application designed to fetch, analyze and file information from web servers at a much higher rate than would be possible for a human alone. There always exists a possibility where web bots can be adversely used to affect the outcome of the referendums served by the present referendum system. In situations where referendum response contamination by web bots is a concern, a CAPTCHA or Completely Automated Public Turing test to tell Computers and Humans Apart) is used in conjunction with the interface on which a referendum is presented to a human respondent in step 40. Reference is made to U.S. Pat. No. 7,929,805 for an implementation of CAPTCHA, which is incorporated herein by reference in its entirety. In one embodiment, a CAPTCHA is served alongside a referendum that is being served with the referendum displayed in its entirety. In another embodiment, a CAPTCHA is configured to supersede a referendum to be displayed. In the latter embodiment, the referendum is served upon having met the CAPTCHA requirement (such as by entering the required CAPTCHA letters and/or numbers or verification answer and a button click). In use, a CAPTCHA corresponding to a verification answer and requiring a user-entered answer is provided before a referendum result can be transmitted to a server system. Upon receiving a user-entered answer, it is compared to the verification answer. If the user-entered answer matches the verification answer, the referendum result is transmitted to the server system and if the user-entered answer does not match the verification answer, the referendum result is not transmitted to the server system.

The Applicant further discovered that by allowing a respondent of a referendum to access and respond to a referendum only during a specific period of time, the amount of contamination due to web bots can be cut down even without the implementation of CAPTCHA. In use, a user is informed in step 27 of the availability of a referendum and the details for accessing it via a means such as an email, a notification within a secured online environment such as a member area of a social networking service and TV advertisements, and the like. The user can then access the pre-announced referendum at a specified future time period via a specified client interface. The Applicant further discovered that, by restricting access of a referendum to a pre-announced time period, referendum participation is increased in certain circumstances as the limited time period of access to a referendum urges users to take deliberate action to respond to the referendum.

FIG. 2 a sequence diagram depicting the anonymous execution of a referendum using a hashed MAC address. This diagram is essentially the same as FIG. 1 with the exception that a MAC address assigned to a network interface of client1 is used instead of a cookie. In this case, client1 comprises a MAC address as shown in the list of facilities in block 9 of FIG. 2. A hashed MAC address is used primarily in interfaces where other means of generating an identifier is not possible or desired.

In one embodiment, hashing of at least a portion of messages from a client system to a server system is performed according to FIPS 180-3 standards as disclosed in the Federal Information Processing Standards publication regarding Secure Hash Standard (SHS) of October 2008 by National Institute of Standards and Technology.

FIG. 2A depicts a mechanism where a token is used to indicate a client source and a hashed term is used to ensure the integrity of the transmission of a referendum answer from the client source. In this example, the client 4 requests a nonce from the server 2 (step 74). Nonce is defined as "number used once" and it is a random or pseudo-random number issued by the server 2. A nonce is transmitted from the server 2 to the client 4 (step 76). Upon receiving the nonce, the client 4 composes a response (step 78). The response includes referendum as identified by refID, an answer to referendum refID, a token, and a hashed term of the nonce, refID and answer. The token can be a cookie previously transmitted to the client 4 by the server 2 when a referendum was requested. The response is then transmitted from the client 4 to the server 2 (step 80). Upon receiving the response from the client 4, the server 2 may increment the token to indicate a response has been received from the client 4. This token can be used/interpreted to either cause the server 2 to ignore or tally a referendum answer depending on the server configuration which indicates whether or not repeated answer submissions from a client 4 will be considered. Upon receiving the response from the client 4, the server 2 further de-hashes the hashed term to verify the integrity of the transmitted answer (step 82), i.e., if the answer indicated in the response equates that of the answer obtained as a result of de-hashing of the previously hashed term, then the answer is considered reliable and may be used if so desired. The response is authenticated if the de-hashed nonce matches the nonce transmitted by the server 2 to the client 4 earlier. A token is then transmitted from the server 2 to the client 4 to indicate that the response was verified (step 84).

FIG. 3 is a block diagram depicting prior art referendum pools maintained by disparate servers. A total of three referendum pools A, B and C is shown in this example. Each referendum database and the facilities required to administer it are collectively referred to as a referendum pool. An end user may choose to interact via internet or another communication medium with servers for pools A, B and C separately. Each pool has its own list of referendums and is not shared with other pools. For example, each pool may be connected to an online community. A community may be a social network such as Facebook, a professional network such as LinkedIn, a search engine such as Google, a database of a company such as Microsoft and the like. Often times, such databases contain referendum information that by themselves, may not be sizeable to be statistically significant. Statistical data may be used in a number of ways such as for forecasting production volume and enabling focusing of resources on events are the most critical to a company, etc.

FIG. 4 is a block diagram of the present invention depicting a mechanism by which referendum pools of disparate servers are shared. The Applicant discovered a novel mechanism that facilitates sharing of referendum results from disparate pools. An index pool server 50 is provided to receive and process referendum proposals from various referendum pools and reconcile them before adding them to a global list. Each pool may alternatively be configured to be fully shared, partially shared or not shared. In a full share situation, all referendums within a pool is shared with the index pool server 50 and other pools which in this example A, B and C that are connected within the network. In this example, pool A is configured to fully share its referendums and their corresponding results, pool B is configured to partially share its referendums and their corresponding results and pool C is configured to not share any of its referendums. The sharing of referendums within a referendum pool may alternatively be configured at the referendum level, i.e., each referendum may contain a switch to specify whether or not its creation and collected results will be shared with other referendum pools and the index pool server 50.

Figure 5:
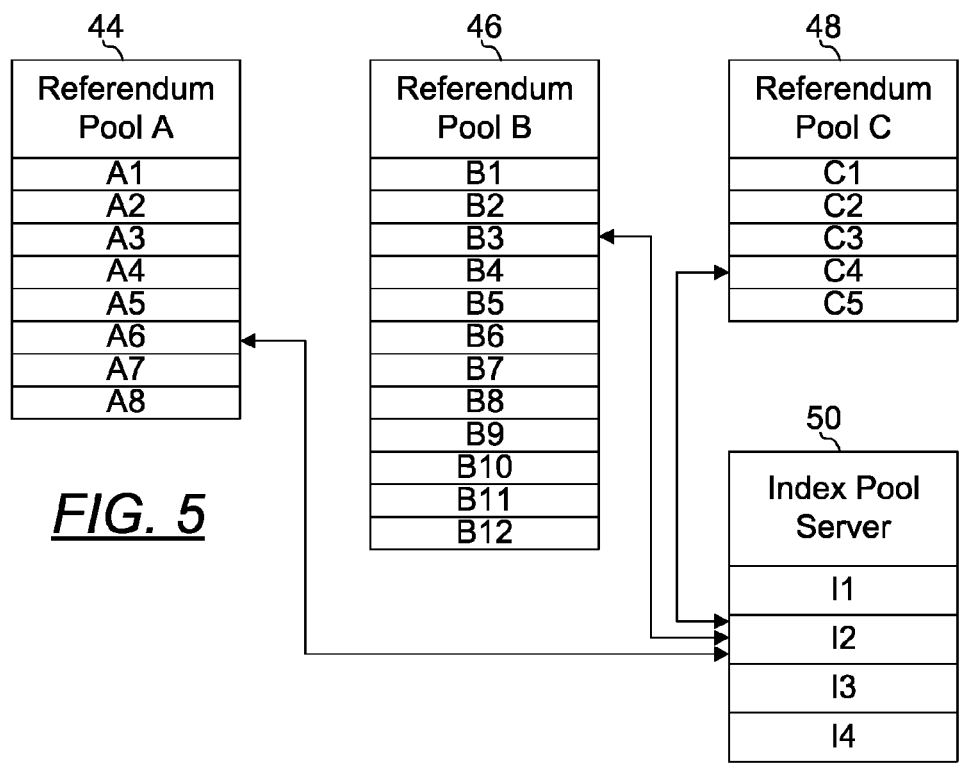
FIG. 5 is a block diagram of the present invention depicting referendum pools of disparate servers linked to an index pool server.
Figure 6:
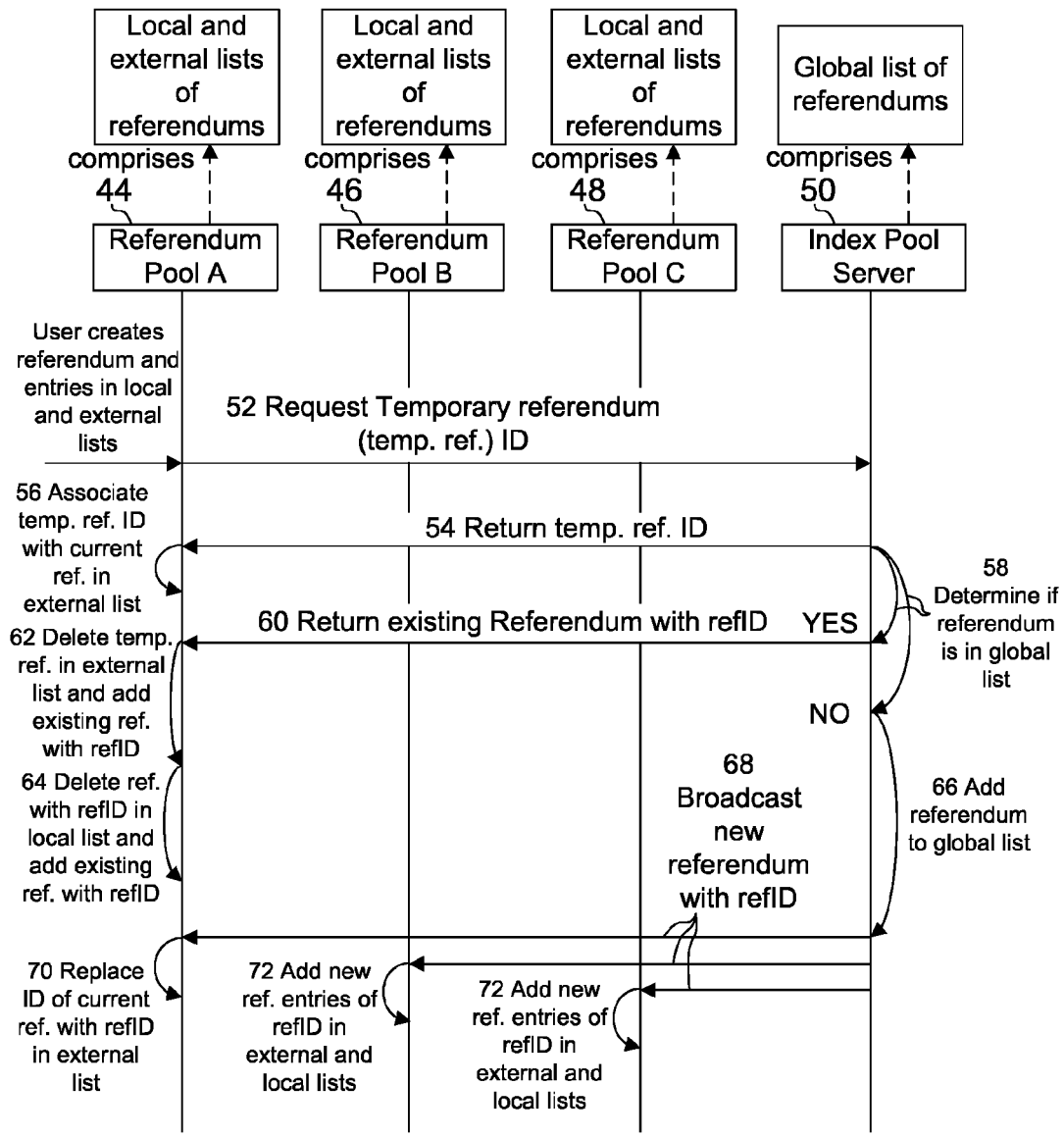
FIG. 6 is a sequence diagram depicting a synchronization process of a plurality of referendum pools.

FIG. 5 is a block diagram of the present invention depicting referendum pools 44, 46, 48 of disparate servers that are linked to an index pool server 50. Each pool maintains its own list. For example, referendum A6 of pool A 44, referendum B3 of pool B 46, referendum C4 of pool C 48 are shown to be equivalent and they are represented as referendum I2 in the index pool server 50. FIG. 6 is a sequence diagram depicting a synchronization process of a plurality of referendum pools using a mechanism according to the present invention. Each referendum pool 44, 46, 48 includes an external list and a local list. A local list is used to track all referendums created, utilized or maintained within a pool. An index pool server 50 is provided to facilitate creation of referendums from referendum pools which subscribe to its service and maintain a global list of referendums. An external list of a current referendum, on the other hand, contains referendums created in the current referendum pool or any referendums created in other referendum pools but shared with the current referendum pool.

Figure 5A:
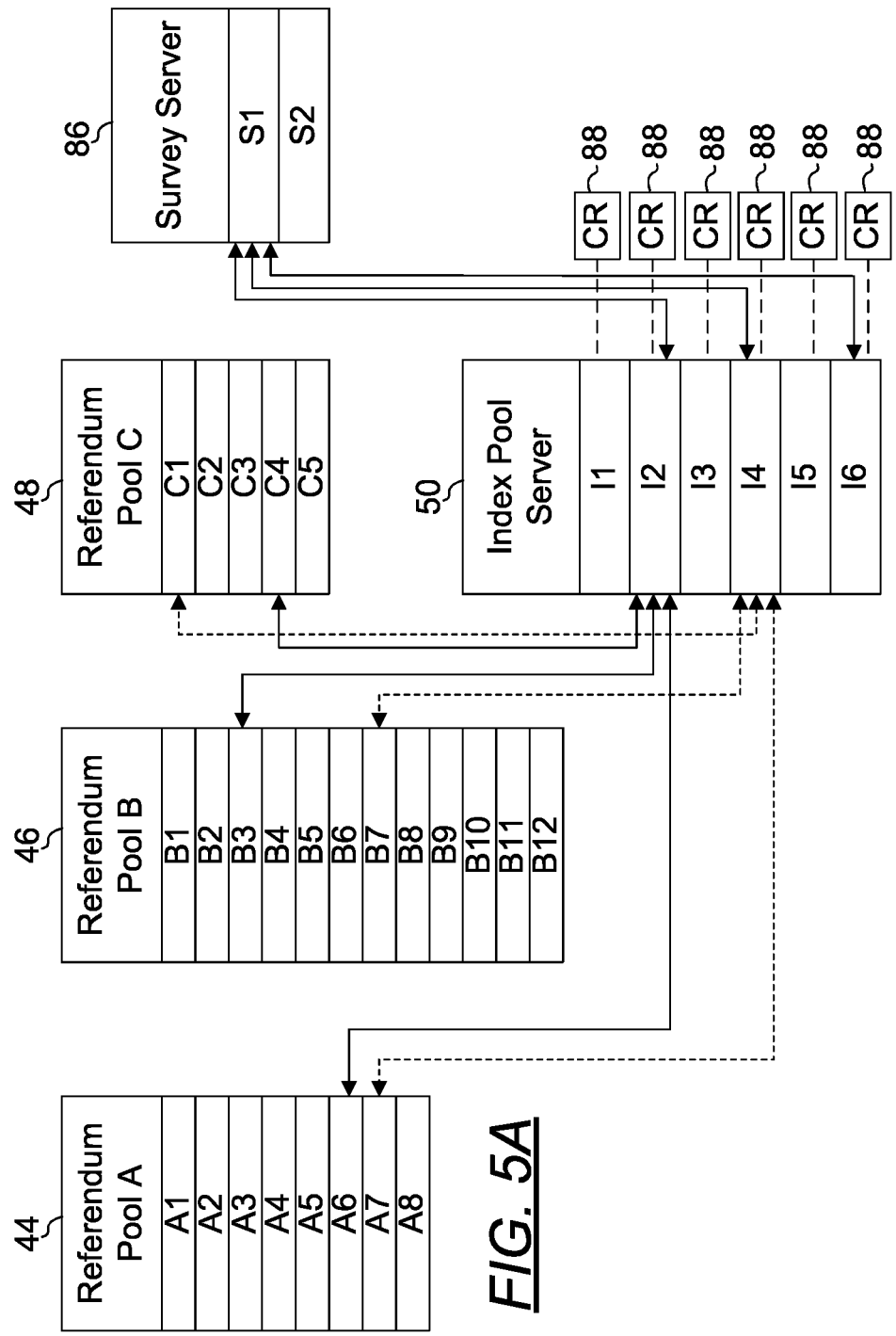
FIG. 5A is a block diagram of the present invention depicting a survey server that is linked to the index pool server of FIG. 5.

FIG. 5A is a block diagram of the present invention depicting a survey server 86 that is linked to the index pool server of FIG. 5. In this example, the survey server 86 contains surveys S1 and S2 which are essentially supersets of referendums. The Applicant discovered that the concept of utilizing an index pool server 50 to standardize referendums from different pools A, B and C is made possible only by using referendums as they represent the most rudimentary opinion solicitation means. In this example, survey S1 is linked to referendums I2, I4 and I6 of the index pool server 50. Therefore I2, I4 and I6 are called linked members of survey S1. An administrator can choose to display these referendums one at a time or all at the same time. In the case where multiple referendums are displayed at once, an additional button is provided to a user in order to effectuate submission of one or more answers of the referendums to the administrator. In the case where one referendum is displayed at one time, a set of criteria 88 is further provided to each referendum in the index pool server 50. Upon serving the first referendum, the ensuing referendum/s are served or displayed based on the answer provided to the first referendum or the referendum preceding it. If the number of referendums having all of their criteria met exceeds one, the referendums are displayed in a random order. Any referendum linked to a member of the survey server will only be served if all criteria have been met. Therefore, only suitable referendums which are the most relevant to the interests of a user are served in a survey. As an example, referendums I2, I4 and I6 represent the following respectively:

I2: What color do you like for your car, dark or light?
Choice 1: Dark.
Choice 2: Light.
I4: Do you prefer "Obsidian Black" to "Jet Black?"
Choice 1: Yes.
Choice 2: No.
I6: Do you prefer "Pearl White" to "Metallic White?"
Choice 1: Yes.
Choice 2: No.

I4 is configured to include only one criterion and the criterion is "Dark" while I6 is configured to also include only one criterion and the criterion is "Light." Assuming I2 is selected as the starting referendum and if the answer to I2 is Choice 1, I4 will be selected. If Choice 2 of I2 is selected, I6 will be served instead.

In the context of a survey having two or more linked members, upon receiving a request for referendums, the present referendum system serves the very first referendum of the survey based upon the method an unlinked referendum is served, as it was disclosed elsewhere herein. In one embodiment, the ensuing referendums of the survey are served based on the concept of matching the criteria of a current referendum and the response to a previously served referendum. In another embodiment, the referendums of a survey are placed in a prefixed order and served based on a time schedule. Referring back the example of FIG. 5A, lacking a user response, referendums I2, I4 and I6 can each be served for a prefixed period of time in the order of I2, I4 and I6. The Applicant discovered that by cycling referendums in a survey, its participation can be significantly improved.

Referring to FIG. 6, a user first creates a referendum with a local identifier in the external and local lists of referendum pool A. As a result, a request for a temporary referendum identifier is transmitted from referendum pool A to the index pool server 50 (step 52). The index pool server 50 then returns a temporary referendum identifier to referendum pool A (step 54). Referendum pool A then associates the temporary referendum identifier with the current referendum in the external list of referendum pool A (step 56). The index pool server 50 then determines if the current referendum is equivalent to a member of the global list by comparing the current referendum to all members of the global list (step 58). In one embodiment, step 58 is performed by comparing keywords of the current referendum to keywords of all members of the global list. In another embodiment where keywords comparison leaves ambiguity as to the equivalence of the current referendum and any member of the global list, a manual comparison is performed. If the current referendum is equivalent to a member of the global list, the member is transmitted to referendum pool A (step 60). The temporary referendum identifier and the current referendum are deleted from the external list of referendum pool A (step 62). The current referendum is deleted from the local list of referendum pool A and the member is added to the local and external lists of referendum pool A (step 64).

If the current referendum is not equivalent to any member of the global list, the current referendum is added to the global list (step 66). The current referendum is broadcast to the plurality of referendum pools B, C (step 68). The local identifier of the current referendum is replaced with the global identifier of the current referendum (step 70). The current referendum is added to all external and local lists of the other referendum pools of the plurality of referendum pools B,C (step 72). Upon completing step 72, all referendum pools that subscribes to the index pool server 50 now includes the new referendum created in referendum pool A and a common ID, i.e., which references the new referendum.

The following example illustrates a situation where manual deliberation may be required. Referendum 1: "Would you vote for Prime Minister Julia Gillard in 2014? Yes or No"

Referendum 2: "Re-elect Prime Minister Julia Gillard in 2014? Yes or No"

Although Referendums 1 and 2 share several keywords, manual deliberation may be required to ensure that the two referendums are equivalent.

As a second example, consider the following referendum:
Referendum 3: "I will not vote for Prime Minister Julia Gillard in 2014? Yes or No"

Logically, Referendum 3 is the inverse of Referendums 1 and 2. In one embodiment, an inverse operator may be applied to Referendum 3 to produce an equivalent referendum such as Referendum 1 or 2.

The benefit of the present method of sharing referendum information across multiple referendum pools becomes apparent for referendums in different languages.

As a third example, consider the following referendum:
Referendum 4: "¿Quieres votar por el Primer Ministro Julia Gillard en 2014? Si o No" Referendum 4, which is expressed in Spanish, can be translated to a phrase that is equivalent to Referendums 1 or 2. The benefits of the ability to link referendums of various referendum pools become apparent when such linkages increase the size of a referendum pool to include other referendum pools subscribing to the same index pool server.

In the context of an internet search engine, the present referendum system cooperates with internet search engines to improve search results. One key component affecting the presentation of a search result (such as web position) is the popularity of a web page. One key component affecting the popularity of a web page lies in the number of quality clicks it receives. Although various internet search engines may define their quality clicks differently, most are configured to treat clicks from human users as quality clicks while clicks from robotic users are frowned upon. It is contemplated by the present invention that a robotic user may be any non-human operator (i.e., an internet bot, web bot program, virus, robot, web crawler, web spidering program, or any software applications that run automated tasks over the Internet), which is an artificial agent that, by its actions, conveys a sense that it has intent or agency of its own. A human user is contemplated as being a human, but also, an entity (virtual or physical) acting under the present intent of a human operator. Typically the web position of a web page is proportional to the number of quality clicks it receives. The present referendum system provides referendums that may be presented as results of an internet search. As a content enhancer, a referendum is served alongside main contents of a web page. The referendum aids in the web position of the web page by serving as a means to verify that the user of the web page is a human user. By providing an interface for human user interactions, the present referendum system allows the use of the referendum as a means for an internet search engine to tally quality clicks. Further, an internet search engine may further utilize the results of referendums to determine the web position of a web page. For instance, a web page associated with a referendum having a higher number of votes may be web positioned more favorably than a referendum that garners a lower number of votes.

More specifically, the internet search engine includes a search method for determining the web position of a referendum relative to other web pages indexed by the internet search engine. The search method first indexes the referendum. The search method then determines the number of quality clicks the referendum received before normalizing it to a normalized value. A normalized value indicates the degree of relevance of an indexed web page as compared to a search target of an internet search and it may include factors such as the number of quality clicks to a web page, the amount of changes to a web page over a period of time, the number of highly ranked incoming links and the like. The search method then compares the normalized value to normalized values corresponding to the other web pages indexed by the internet search engine. If the normalized value is higher than the normalized value corresponding to at least one of the other indexed web pages, the referendum is assigned a more favorable web position relative to the at least one of the other indexed web pages. If the normalized value is lower than the normalized value corresponding to at least one of the other indexed web pages, the referendum is assigned a less favorable web position relative to the at least one of the other indexed web pages.

I claim:

1. A method of conducting a referendum anonymously, said method comprising the steps of:
   (a) transmitting a request from a client system to a server system, wherein said request comprises at least one user specific data, said client system comprises an internet search engine;
   (b) determining a referendum as identified by a referendum identifier and corresponding to said at least one user specific data of said request;
   (c) returning said referendum from said server system to said client system, wherein said returning step further comprises:
   calculating a web position of said referendum relative to at least one other web page indexed by said internet search engine; and said calculating step comprises the steps of
   (i) indexing said referendum;
   (ii) determining the number of quality clicks said referendum received;
   (iii) normalizing the number of quality clicks said referendum received to a normalized value; and
   (iv) comparing said normalized value to the normalized value corresponding to said at least one other web page, whereby if said normalized value is higher than the normalized value corresponding to said at least one other web page, said referendum is assigned a more favorable web position relative to said at least one other web page indexed by said internet search engine and if said normalized value is lower than other normalized values corresponding to said at least one other web page, said referendum is assigned a less favorable web position relative to said at least one other web page;
   (d) transmitting a referendum result from said client system to said server system via a message having a header portion and a data portion, wherein said header portion comprises a unique identifier identifiable to said server system as originating from a source but not identifiable with respect to the true identity of said client system;
   (e) comparing said unique identifier to a list of unique identifiers, whereby if said unique identifier does not match a member of said list of unique identifiers, said referendum result is added to a database relating said referendum to a list of referendum results and if said unique identifier matches a member of said list of unique identifiers, said referendum result is discarded; and
   (f) adding said unique identifier to said list of unique identifiers.

2. The method of conducting an anonymous referendum of claim 1, wherein said at least one user specific data comprises geolocation data.

3. The method of conducting an anonymous referendum of claim 1, wherein said at least one user specific data comprises at least one keyword.

4. The method of conducting an anonymous referendum of claim 1, wherein said unique identifier comprises an entity selected from a group consisting of hashed cookie and hashed MAC address.

5. The method of conducting an anonymous referendum of claim 1, wherein said client system is selected from a group consisting of web browser, online newspaper, browser-controlled environment, an interface coded in browser-supported language combined with a browser-rendered markup language, social network interface and mobile gaming interface.

6. The method of conducting an anonymous referendum of claim 1, wherein the transmitting step of the referendum result further comprises the steps of:
   (a) providing a Completely Automated Public Turing test to tell Computers and Humans Apart (CAPTCHA) corresponding to a verification answer, said CAPTCHA requiring a user-entered answer; and
   (b) receiving a user-entered answer, whereby if said user-entered answer matches said verification answer, said referendum result is transmitted to said server system and if said user-entered answer does not match said verification answer, said referendum result is not transmitted to said server system.

7. The method of conducting an anonymous referendum of claim 1, wherein said determining step further comprises the step of returning a notification from said server system to said client system a future time period during which said referendum is to be served.

8. The method of conducting an anonymous referendum of claim 1, wherein said data portion is configured to be encrypted with a public key and decoded with a private key.

9. A system for conducting at least one referendum anonymously, said system comprising:
   (a) a storage to store a result associated with said at least one referendum;
   (b) at least one server system to serve said at least one referendum over a network to users using a process;
   (c) at least one client system to transmit a referendum result of said at least one referendum to said server system via a message including a header portion and a data portion, said header portion comprising a unique identifier identifiable to said server system as originating from a source but not identifiable with respect to the true identity of said at least one client system; and
   (d) said at least one server system compares said unique identifier to a list of unique identifiers, whereby if said unique identifier does not match a member of said list of unique identifiers, said referendum result is added to said storage and if said unique identifier matches a member of said list of unique identifiers, said referendum result is discarded, wherein said at least one client system comprises an internet search engine and said process comprises calculating a web position of said at least one referendum relative to at least one other web page indexed by said internet search engine; and said calculating step comprises the steps of
   (i) indexing said at least one referendum;
   (ii) determining the number of quality clicks said at least one referendum received;
   (iii) normalizing the number of quality clicks said at least one referendum received to a normalized value; and
   (iv) comparing said normalized value to the normalized value corresponding to said at least one other web page,
   whereby if said normalized value is higher than the normalized value corresponding to said at least one other web page, said at least one referendum is assigned a more favorable web position relative to said at least one other web page indexed by said internet search engine and if said normalized value is lower than other normalized values corresponding to said at least one other web page, said at least one referendum is assigned a less favorable web position relative to said at least one other web page.

10. The system of claim 9, wherein said at least one client system further comprises an index pool server configured to index said at least one referendum from said at least one server system such that said at least one referendum can be shared with another server system of said at least one server system.

11. The system of claim 9, wherein said at least one client system further comprises a survey server configured to link said at least one referendum and another one of said at least one referendum to form one or more surveys.

12. The system of claim 9, wherein said data portion is configured to be encrypted with a public key and decoded with a private key.

* * * * *